United States Patent [19]
Cost

[11] 4,124,326
[45] Nov. 7, 1978

[54] CUTTING INSERT WITH RAISED CUTTING EDGE

[75] Inventor: John C. Cost, Hazel Park, Mich.

[73] Assignee: The Valeron Corporation, Oak Park, Mich.

[21] Appl. No.: 756,181

[22] Filed: Jan. 3, 1977

[51] Int. Cl.² .............................................. B26D 1/12
[52] U.S. Cl. .................................................. 407/114
[58] Field of Search ...................... 29/95, 96; 407/114

[56] References Cited

U.S. PATENT DOCUMENTS

| | | | |
|---|---|---|---|
| 1,756,516 | 4/1930 | Klopstock | 29/95 R |
| 3,416,209 | 12/1968 | Contrucci et al. | 29/96 |
| 3,421,196 | 1/1969 | Reich | 29/95 R |
| 3,733,664 | 5/1973 | McKelvey | 29/95 R |
| 3,973,307 | 8/1976 | McCreery et al. | 29/95 R |

FOREIGN PATENT DOCUMENTS

| | | | |
|---|---|---|---|
| 1,517,204 | 2/1968 | France | 29/95 R |
| 7,300,644 | 7/1974 | Netherlands | 29/95 R |
| 278,611 | 10/1927 | United Kingdom | 29/95 R |

*Primary Examiner*—Harrison L. Hinson

[57] ABSTRACT

A cutting insert of hard wear resistant material such as sintered tungsten carbide having a raised negative rake cutting land forming an obtuse cutting edge angle with side walls extending normal to the cutting face. A gradual sloping surface from the inner margin of the raised cutting land provides strength compatible with downward chip flow to meet the internal substantially flat face of the insert. In a preferred embodiment a center island is provided extending to the top level of the raised cutting land which permits relatively lighter starting feeds and greater range of feed rates.

18 Claims, 9 Drawing Figures

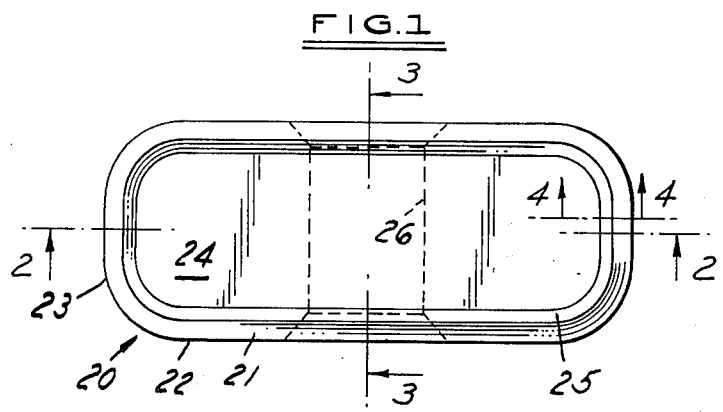
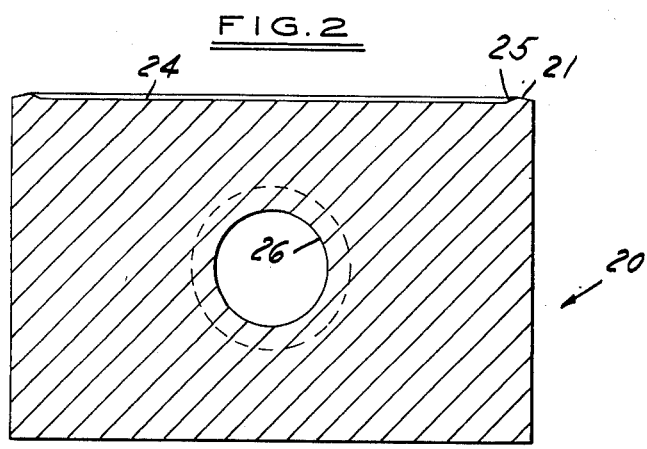
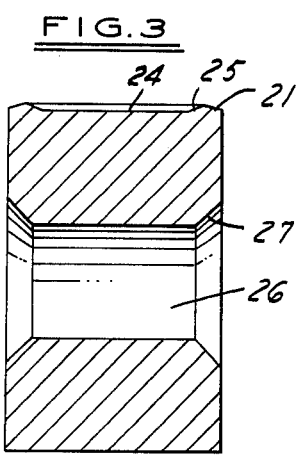
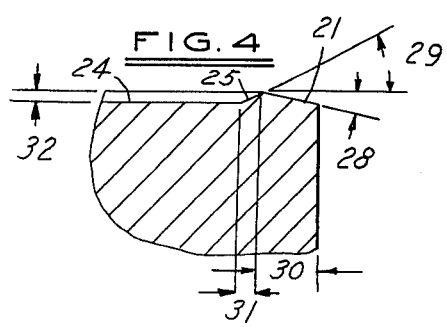

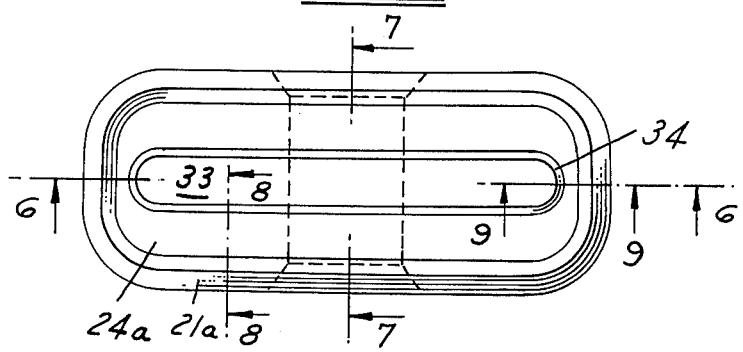
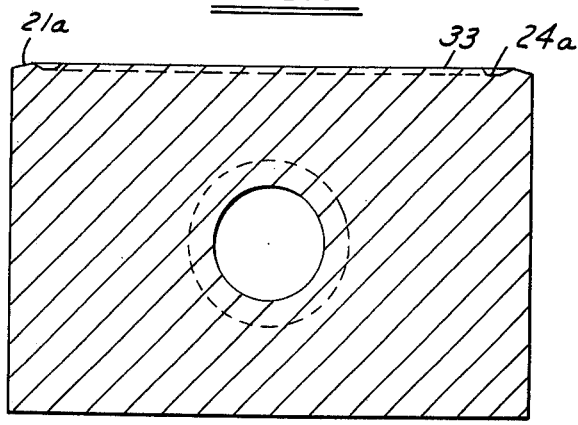
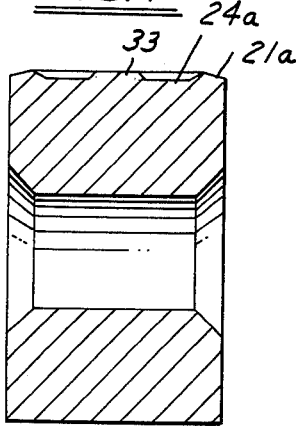
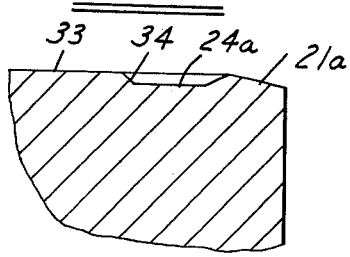
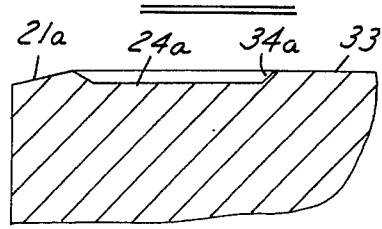

CUTTING INSERT WITH RAISED CUTTING EDGE

BACKGROUND OF THE INVENTION

Cutting inserts particularly adapted for high cutting rate removal of relatively tough metals such as encountered in the turning of railway wheels has led to the development of tungsten carbide inserts with special cutting edges and faces directed to basic objects of increasing the rate of stock removal through greater depths of cuts, increased range of cutting feed rates with good chip control, as well as extending the useful life of each insert relative to the quantity of stock removal. In this regard standard indexable features have been employed and face configurations developed which will minimize power and heat dissipation requirements at the cutting edge.

As a result of concerted efforts by a number of competitive companies to continually improve performance of cutting inserts in these regards, a high degree of refinement of design has produced numerous insert styles having superficially similar appearance aspects.

Typical of the closest prior art inserts known to applicant are those produced by a Swedish company (Sandvikens Jernverks Aktiebolag) and sold under the trade mark "Sandvik Coromant T-Max P Tooling Inserts" examples of which are illustrated in a published brochure entitled "T-Max P Tool System for Railway Wheel Returning"; and cutting inserts disclosed in U.S. Pat. Nos. 3,973,307 and 3,421,196.

While such references teach various individual elements of applicant's improved insert construction there are a number of subtle but critical combinational distinctions which tests have proven to provide unexpected comparative results.

BRIEF SUMMARY OF THE INVENTION

Applicant's improved cutting insert is characterized by a raised peripheral negative rake cutting edge land providing an obtuse angle with side and end walls extending normal to the cutting face and having arcuate corners. A gradual inward slope from the inner margin of the negative rake raised cutting land extends to a relatively flat face surface at or near the level of the outermost cutting edge and provides support for such inner margin compatible with downward chip flow.

In a preferred embodiment of applicant's insert construction a raised island is provided in the center of the cutting face projecting to the level of or slightly above the uppermost level of the raised cutting land, such island being spaced from the cutting edge a distance approximately five times the width of the raised cutting land. In the case of an elongated insert the raised island preferably extends closer to the cutting land at the narrow ends of the insert.

BRIEF DESCRIPTION OF THE DRAWINGS

FIG. 1 is a plan view of a first embodiment of the cutting insert;

FIG. 2 is a sectional view taken along the line 2—2 of FIG. 1;

FIG. 3 is a sectional view taken along the line 3—3 of FIG. 1;

FIG. 4 is an enlarged fragmentary view taken along the line 4—4 of FIG. 1;

FIG. 5 is a plan view of a preferred embodiment of the invention;

FIG. 6 is a sectional view taken along the line 6—6 of FIG. 5;

FIG. 7 is a sectional view taken along the line 7—7 of FIG. 5;

FIG. 8 is an enlarged sectional view taken along the line 8—8 of FIG. 5; and

FIG. 9 is an enlarged sectional view taken along the line 9—9 of FIG. 5.

DETAILED DESCRIPTION OF THE INVENTION

With reference to FIGS. 1-4 the illustrated cutting insert 20 includes a peripheral negative rake raised cutting edge land 21 terminating at and forming an obtuse angle with the side walls 22 and end walls 23 joined by arcuate corners and extending normal to the flat interior face 24 of the insert. A gradually descending surface 25 extends from the top inner margin of the cutting edge land 21 to the flat face 24. The raised cutting edge land 21, due to the negative rake forming an obtuse angle with the side and end walls, provides greater corner strength against shock loads and cutting pressures than a 90° corner; and likewise greater inner margin strength for the cutting land results from the gradual angle of the surface 25 than in the case of a right angle or more sharply cornered inner margin.

The insert is adapted with a transverse aperture 26 chamfered at 27 for the head of a clamping screw (not shown) thus adapting the insert to side wall clamping against a suitable insert holder wall having a corner pocket to engage the bottom and one end surface of the recess as well as the side wall to which the insert is directly clamped. Optionally, particularly with wide inserts, a central aperture normal to the cutting face may be employed to clamp the bottom of the insert directly to a corner pocket wall of a suitable holder.

With reference to FIG. 4, the angle 28 of the negative rake cutting land may be within a range of 5° to 30° and is preferably approximately 10°. The inner slope 25 may have an angle 29 within a range of 10° and 45° and is preferably approximately 20°. In the case of a typical insert adapted for heavy-duty railway wheel turning, a typical insert has been constructed and tested having an overall length of 1.181 inches, a height of 0.750 inch, and a width of 0.472 inch. For railway wheels and general use the width 30 of the land 21 may be within the range of 0.010 to 0.040 of an inch with 0.025 to 0.035 preferred for railway use and 0.015 to 0.035 preferred for general use. The width 31 of the inner slope 25 will vary somewhat with the angle 29 while the top extremity of the inner margin of land 21 and slope 25 extends approximately 0.005 of an inch above the center face 24 as indicated at 32 in FIG. 4.

With reference to FIGS. 5-9, the illustrated preferred embodiment of the insert is substantially identical to the embodiment of FIGS. 1-4 except for the addition of a center island 33 extending above the face 24a to a level substantially coincident with the upper extremity of the raised cutting edge land 21a. As best shown in FIGS. 7, 8, and 9, the island 33 is preferably dimensioned to provide an intermediate width of face 24a along the side of the insert in a range of 4 to 6 times the width of the cutting land with 5 times being preferred in most cases, while the intervening width of the face 24a at the end of the island is substantially reduced from that of the side to an order of approximately twice the width of the cutting land or even less. The island 33 may be provided with a somewhat steeper slope 34 extending down to the face 24a in the order of 40°.

Tungsten carbide inserts constructed in accordance with the foregoing specific examples have been found to provide excellent cutting operation in railway wheel turning involving a typical "4340" type of forged or rolled steel. In relation to other comparable competitive tungsten carbide inserts which provide a normal depth of cut in the order of ¼ to 1 inch and a range of feed rates from 0.030 to 0.090 of an inch, applicant's insert without the island, as illustrated in FIGS 1-4, was found to provide satisfactory results over a range of feed rates from 0.035 to 0.120 of an inch while the preferred embodiment with the island as illustrated in FIGS. 5-9 was found to provide an extended range of feed rates covering from at least 0.020 to 0.120 of an inch with good chip control throughout. Thus, the island was found to permit substantially lighter starting feeds and greater range of feed rates without reducing the maximum rate.

The flat surface in the cutting face inside the raised cutting edge was found to deflect and control chip formation to a greater extent and with less power than where an arcuate chip control groove was employed in which the chip drag extended over substantially the complete width of the chip control groove. Also while it is standard practice for chip control grooves to extend substantially below the cutting edge, applicant's use of a flat chip deflecting face at substantially the same level as the exterior cutting edge when combined with a raised negative rake cutting land was surprisingly found to provide better results both with regard to chip control and reduced power requirements.

In the preferred embodiment of FIGS. 5 to 9 provided with the center island the substantial width of the intervening flat (5 times the width of the cutting land) was found to result in chip control at the heavier feed rates without chip contact at the center island while at the lower feed rates where long curling chips would tend to prevail in the absence of the center island, the provision of such island is found to result in chip engagement, and satisfactory control. Furthermore, at the end of the cutting insert where relatively shallower depths of cut are involved, the reduced width of the intervening flat between cutting land and island was found to improve chip control over a comparable insert with uniform spacing of the island from the cutting land.

In all comparative tests the negative rake angle of applicant's cutting land was surprisingly found to reduce horsepower as well as to provide a stronger corner against impact and cutting pressure breakage. Cutting speeds in the order of 120 to 300 feet per minute were used in making the tests.

I claim:

1. A cutting insert comprising a hard, wear resistant material, said insert having a cutting face including a continuous substantially flat surface, said cutting face having a raised peripheral negative rake cutting land extending entirely around said substantially flat surface and having an outer and inner margin, said insert having a pair of side and a pair of end walls, said walls being joined by arcuate corners and terminating at the outer margin of said negative rake cutting land and defining a continuous cutting edge, said walls extending normal to said substantially flat surface providing an obtuse included cutting angle, a sloping surface extending from the inner margin of said cutting land to said substantially flat surface and a chip control center island extending above said substantially flat surface spaced from said cutting land and providing a more narrow flat surface at the end wall portion of said insert than at said side wall.

2. A cutting insert as set forth in claim 1 wherein the outer periphery of said cutting edge extends at approximately the same level as said substantially flat surface.

3. A cutting insert as set forth in claim 1 wherein said raised cutting land extends to an uppermost level approximately 0.005 of an inch above said substantially flat surface.

4. A cutting insert as set forth in claim 1 wherein said negative rake cutting land extends at an angle within a range of 5° and 30° relative to said substantially flat surface.

5. A cutting insert as set forth in claim 4 wherein said angle is approximately 10°.

6. A cutting insert as set forth in claim 1 wherein said sloping surface extends at an angle within a range of 10° and 45° relative to said substantially flat surface.

7. A cutting insert as set forth in claim 6 wherein said angle is approximately 20°.

8. A cutting insert as set forth in claim 1 wherein said negative rake cutting land has a width within a range of 0.010 to 0.045 of an inch.

9. A cutting insert as set forth in claim 8 wherein said land width is within a preferred range of 0.015 to 0.035 of an inch.

10. A heavy-duty cutting insert as set forth in claim 9 wherein said land width is within a preferred range of 0.025 to 0.035 of an inch.

11. A cutting insert as set forth in claim 1 wherein said chip control center island extends to substantially the same height as the uppermost level of said negative rake cutting land.

12. The cutting insert as set forth in claim 1 wherein the substantially flat surface extending between said negative rake cutting land and said chip control island along the side portions of said insert has a width within a range of 4 to 6 times the width of said negative rake cutting land.

13. A cutting insert as set forth in claim 12 wherein the intervening width of said substantially flat surface between the negative rake cutting land and chip control island is reduced at the ends of said insert to approximately 2 times or less the width of said negative rake cutting land.

14. A cutting insert as set forth in claim 12 wherein said negative rake cutting land has a width within a range of 0.010 to 0.045 of an inch.

15. A cutting insert as set forth in claim 13 wherein said negative rake cutting land has a width within a range of 0.010 to 0.045 of an inch.

16. A cutting insert as set forth in claim 1 wherein said hard wear resistant material is sintered tungsten carbide.

17. A cutting insert as set forth in claim 1 wherein said insert is removably indexable to a plurality of cutting positions.

18. A cutting insert as set forth in claim 1 wherein a central aperture is provided through said insert adapted to receive a clamping screw.

* * * * *